United States Patent [19]

Willenz et al.

[11] Patent Number: 5,553,268
[45] Date of Patent: Sep. 3, 1996

[54] MEMORY OPERATIONS PRIORITY SCHEME FOR MICROPROCESSORS

[75] Inventors: Avigdor Willenz, Campbell; Philip Bourekas, San Jose; Yehayahu Mor, Cupertino, all of Calif.

[73] Assignee: Integrated Device Technology, Inc., Santa Clara, Calif.

[21] Appl. No.: 715,294

[22] Filed: Jun. 14, 1991

[51] Int. Cl.$^6$ .................................................. G06F 13/18
[52] U.S. Cl. ..................... 395/485; 295/478; 364/DIG. 1
[58] Field of Search .............................. 364/200 MS File, 364/900 MS File; 395/400 MS File, 425 MS File, 485, 478

[56] References Cited

U.S. PATENT DOCUMENTS

| | | | |
|---|---|---|---|
| 4,067,059 | 1/1978 | Derchak | 395/425 |
| 4,829,467 | 5/1989 | Ogata | 395/725 |
| 5,057,837 | 10/1991 | Colwell et al. | 364/200 |
| 5,193,189 | 5/1993 | Flood et al. | 395/650 |
| 5,253,348 | 10/1993 | Scalise | 395/325 |
| 5,263,142 | 11/1993 | Watkins et al. | 395/425 |

Primary Examiner—Reba I. Elmore
Attorney, Agent, or Firm—Skjerven, Morrill, MacPherson, Franklin and Friel

[57] ABSTRACT

A structure and a method are provided to implement a memory bus arbiter, in which separate priorities are provided to instruction and data reads from the main memory. In one embodiment in a microprocessor with an on-chip cache, the present invention provides an arbiter which yields the memory bus, in decreasing priority order, to an ongoing bus transaction, a "direct memory access" (DMA) request, an instruction read resulting from a cache miss, a pending write request, and a read request, including reference to an uncacheable portion of memory and a data cache miss.

10 Claims, 4 Drawing Sheets

MEMORY OPERATIONS PRIORITY SCHEME FOR MICROPROCESSORS

FIELD OF THE INVENTION

This invention relates to computer systems, and in particular, relates to computer systems incorporating cache memories and write buffers.

DESCRIPTION OF RELATED ART

In many computer systems, the central processing unit (CPU), the main memory system, and the peripheral or input/output devices ("I/O devices") communicate over a common memory bus, which can either be further divided into data and address components, or time-multiplexed for communicating data and addresses. As a result, the memory bus is a scarce resource. In general, transactions on the memory bus are between either the main memory and the CPU or the main memory and the I/O devices. The CPU reads instructions and data from the main memory, and stores data into the main memory. Writing instructions into the main memory is relatively rare and is generally considered poor programming practice. In a computer system which supports "direct memory access" (DMA), an I/O device reads or stores data directly into memory without intervention by the CPU. In such systems, however, before a DMA transfer can proceed, an I/O device must request permission to exclusive use of the bus, so as to avoid contention with the other users of the bus. Upon completing the DMA transfer, the I/O device must relinquish the bus.

Hence, it can be seen that the bus is a scarce resource, and its use must be carefully allocated in order to maintain the computer system in high performance. Many factors influence the hierarchy of priorities assigned to the various users of the memory bus. For example, when the CPU requires an instruction from the main memory, the CPU must stall until the instruction fetch is completed. However, if the CPU requires a datum to be stored in the main memory, the CPU does not need to wait for the store operation at the main memory to complete before executing the next instruction.

In a microprocessor with an on-chip cache, a memory read can result from either a cache miss or reference to an uncacheable part of memory. Consequently, the line size and the capacity of the cache memory may affect the frequency at which a read access to the main memory is required. Further, for a computer system with a cache "write-through" policy, every store operation results in an access to the main memory. These are additional considerations for a memory bus designer in determining the priority scheme in the memory bus.

Because the processor is not required to stall for a store (i.e. write) operation, one scheme to minimize the processor stalling on a read request when there are incomplete write operations in the prior art provides that, when a reference to a datum is not found in the data cache, the write buffers are first searched for the required datum, before a read operation is initiated on the memory bus. If the required datum is found in the write buffers, a memory bus operation is avoided. Under this scheme, the priority of a write operation can be made lower than a read operation, which requires the processor to stall. However, in some systems, such a priority scheme is not feasible, because it may lead to incorrect operation. For example, in an I/O device such as the Advanced CRT Controller SCC63834 (available from Signetics Corporation, Sunnyvale, Calif.), the read operation may not yield the value of a datum previously written. Instead, a side effect results. In the case of the SCC63834, a read operation returns the status of the device, which bears no relation to any data previously written to the SCC63834. An alternative scheme is to assign all read operations a lower priority than any pending write operation, so that, before a read operation can proceed, all pending write operations must be allowed to complete. Under this alternative scheme, the processor may stall for a number of cycles during the completion of pending write operations, leading to poor performance.

SUMMARY OF THE INVENTION

A structure and a method are provided to implement a memory bus arbiter, in which separate priorities are provided to instruction and data read operations from the main memory. In one embodiment in a microprocessor with an on-chip cache, the present invention provides an arbiter which grants use of the memory bus to, in decreasing priority order, an ongoing bus transaction, a "direct memory access" (DMA) request, an instruction read resulting from a cache miss, a pending write request, and a read request. A read request, other than an instruction read, may arise from reference to an uncacheable portion of memory or a data cache miss.

The present invention provides high performance by minimizing the central processing unit's (CPU's) wait for an instruction read request, and preserves correct operation by requiring all pending writes to complete before a data read request can proceed.

The present invention is better understood upon consideration of the below detailed description and the accompanying drawings.

BRIEF DESCRIPTION OF THE DRAWINGS

FIG. 1b is a block diagram of the processor 101 shown in FIG. 1a.

DETAILED DESCRIPTION

Figure 1A:
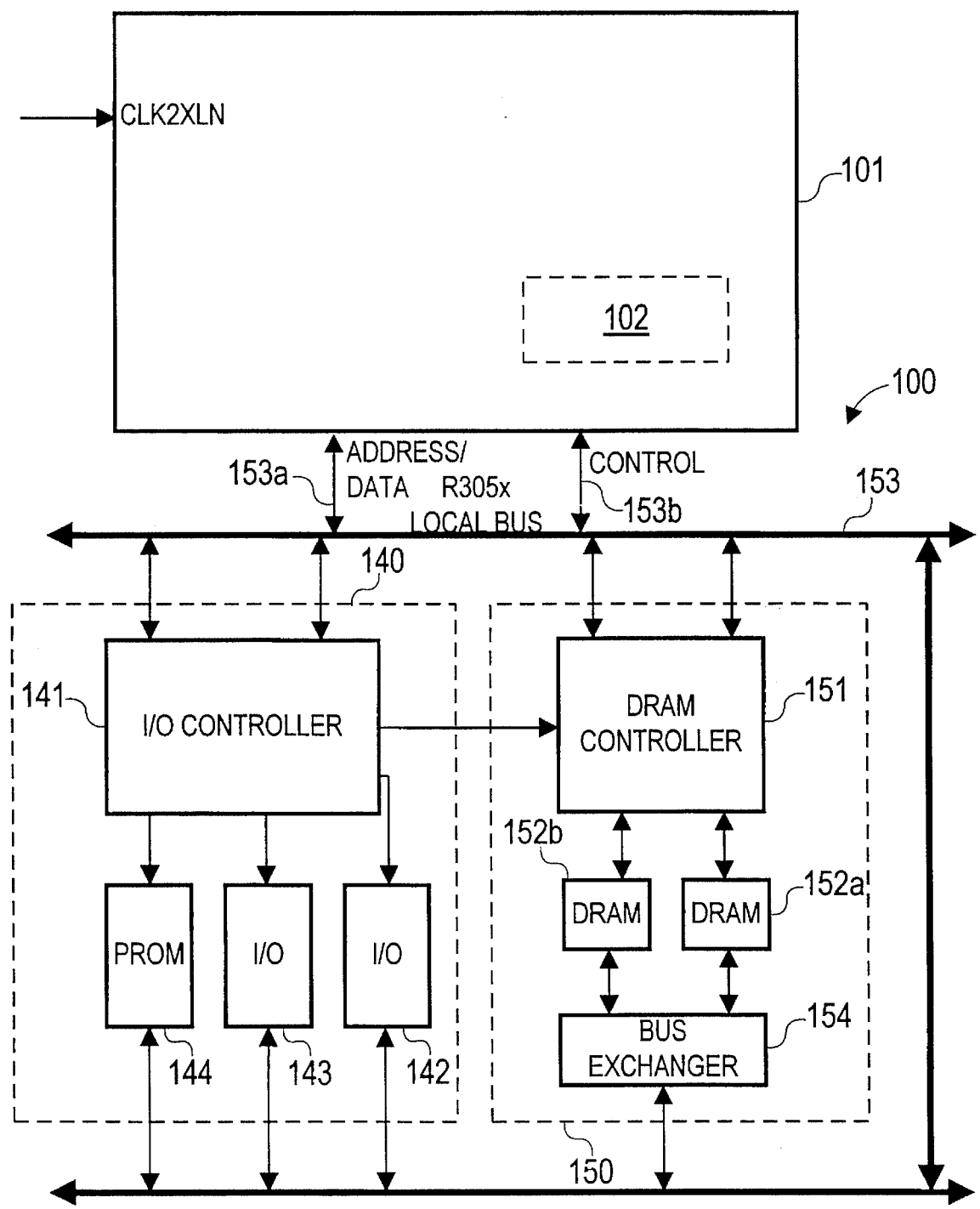
FIG. 1a shows a computer system 100 having processor 101 with an on-chip cache system 102 and an off-chip main memory system 150, in accordance with the present invention.

FIG. 1a shows, as an example, a computer system 100 having a processor 101 with an on-chip cache system 102 and a read and write memory ("main memory") system 150 external to processor 101, in accordance with the present invention. As shown in FIG. 1a, external or main memory system 150, which is interfaced to the processor 101 over a bus 153, comprises a dynamic random access memory (DRAM) controller 151, a main memory 152 implemented by banks 152a and 152b of DRAMs and a bus interface 154. In addition, the address space of computer system 100 is also used to access other memory-mapped devices such as I/O controller 141, I/O devices 142 and 143, and programmable read-only memory (PROM) 144. To facilitate reference, the memory-mapped devices other than the main memory 100 defined above are collectively referred to as the I/O System 140, even though read-only memories, such as PROM 144, are often not considered part of the I/O system. I/O system 140 is also interfaced to the bus 153. Bus 153 comprises address/data bus 153a and control bus 153b. Memory data and memory addresses are time-multiplexed on the 32-bit address/data bus 153a.

Figure 1B:
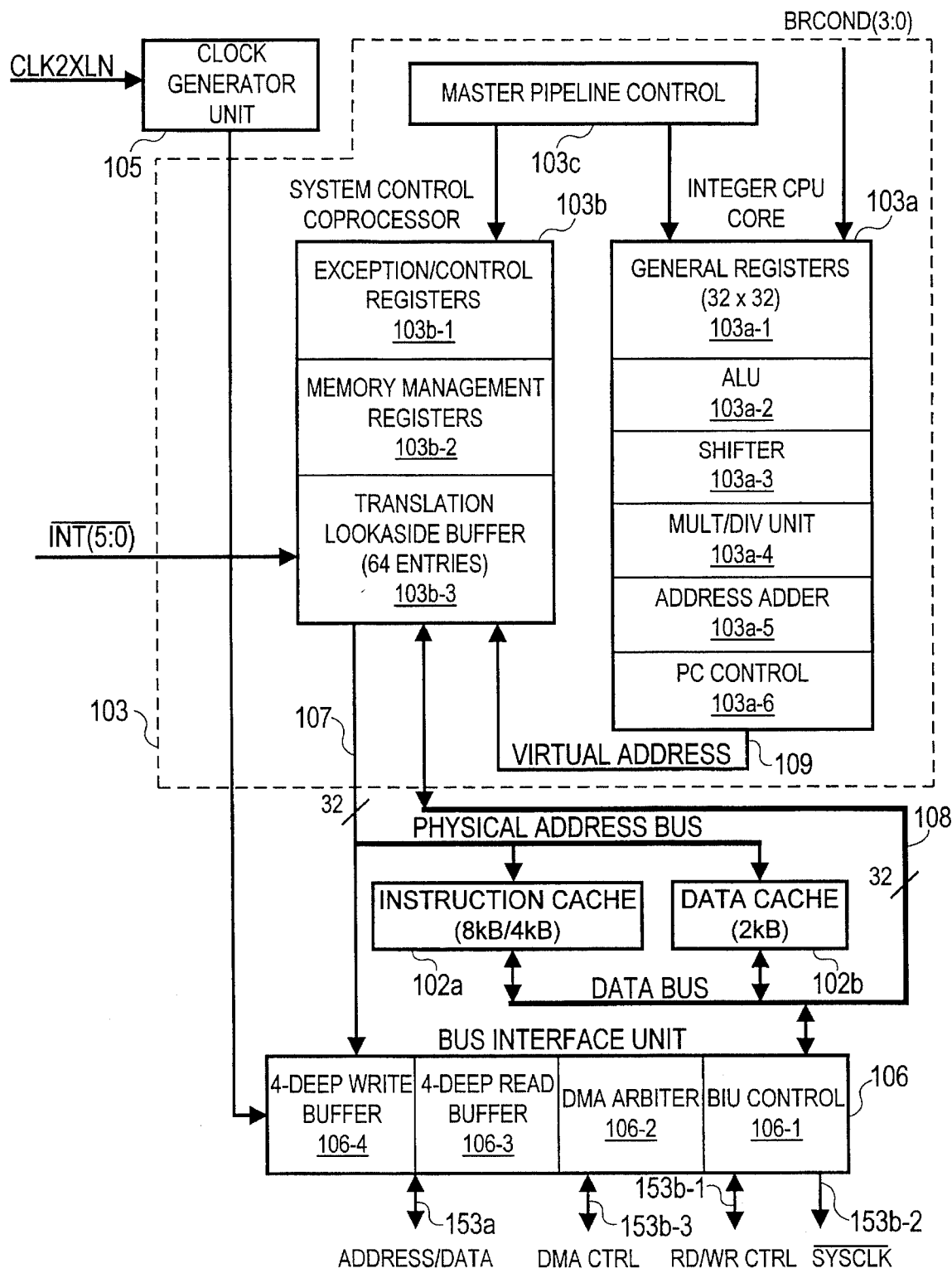

The organization of processor 101 is shown in FIG. 1b. As shown in FIG. 1b, processor 101 includes two co-processors 103a and 103b, controlled by a master pipeline control unit 103c. Coprocessor 103a is also referred to as the integer CPU, and includes 32 32-bit general registers 103a-1, an ALU 103a-2, a shifter 103a-3, a multiplication and division unit 103a-4, an address adder 103a-5, and program counter control unit 103a-6. Processor 103a executes the instruction set known as the MIPS-I Instruction Set Architecture (ISA). Coprocessor 103b, also known as the System Control Coprocessor, comprises exception/control registers 103b-1, a memory management registers unit 103b-2 and a translation look-aside buffer (TLB) 103b-3. The system control coprocessor unit 103b provides a mapping between virtual and physical addresses. The TLB unit 103b-3 has a 64-entry look-up table to provide mapping between virtual and physical addresses efficiently. In this embodiment, the TLB unit 103b-3 is provided at the user's option. The TLB unit 103b-3 can be disabled. These units of the coprocessors 103a and 103b can be implemented by conventional or any suitable designs known in the art. The coprocessor units 103a and !03b, and the pipeline control unit 103c are collectively referred to as CPU core 103.

The cache system 102 of processor 101 comprises two cache memories 102a and 102b. Cache 102a is an instruction cache. In this embodiment shown, the capacity of cache 102a can be either 4K or 8K bytes, and block refill and line sizes of four memory words each. Cache 102b is a data cache, and has a selectable block refill size of one or four memory words, a line size of one memory word, and a capacity of 2K bytes. Other cache, block refill and line sizes can be provided within the scope of the present invention. Both the capacities of cache 102a and cache 102b, and their respective line and block refill sizes, are matters of design choice. In addition, it is also not necessary to provide separate data and instruction caches. A joint data and instruction cache is also within the scope of the present invention. The TLB unit 103b-3 receives from the CPU core 103 on bus 109 a virtual address and provides to either cache 102a or cache 102b on bus 107 the corresponding physical memory address. Although cache access using virtual addresses is also possible, by using physical addressing in the instruction and data caches, the present embodiment simplifies software requirements and avoids the cache flushing operations necessary during a context switch in a virtually addressed cache. The cache addressing scheme of the present embodiment is discussed below in conjunction with FIG. 2. Other cache addressing schemes are also possible within the scope of the present invention.

Bus interface unit (BIU) 106 interfaces processor 101 with the main memory 150 when a read or write access to main memory is required. BiU 106 comprises a 4-deep write buffer 106-4, a 4-deep read buffer 106-3, a DMA arbiter 106-2 and BIU control unit 106-1. BIU control unit 106-1 provides all control signals on bus 153b, which comprises buses 153b-1 to 153b-3 necessary to interface with the main memory 150 and the I/O system 140. Both addresses and data are multiplexed on the address/data bus 153a, and the control signals are provided on the $\overline{Rd/Wr}$ control bus 153b-1, the system clock signal 153b-2, and the DMA control bus 153b-3.

$\overline{Rd/Wr}$ control bus 153b-1 comprises pins Addr[3:2], which provides the least significant two bits of a memory word address, interface control signals $\overline{Rd}$ (read), $\overline{Wr}$ (write), $\overline{DataEn}$ (data enable), $\overline{Burst/WrNear}$ (burst mode or "write near") and $\overline{ALE}$ (address latch enable), and diagnostic signals Diag[1:0]. The DMA control bus 153b-3 comprises DMA control signals on pins $\overline{BusGnt}$ (bus grant) and $\overline{BusReq}$ (bus request). The functions and protocols of the signals in busses 153b-1 and 153b-3 are described in "IDT79R3051™ Family Hardware User's Manual", which is available from Integrated Device Technology, Inc., Santa Clara, Calif., and which is hereby incorporated by in its entirety. The data/address bus 153a comprises pins AD[31:0] which are multiplexed for sending addresses to the main memory 150 and for sending or receiving data to and from the main memory 150.

In this embodiment, an arbiter circuit (described below) is provided in bus interface unit 106-1 to arbitrate the various requests for the use of address/data bus 153a. The possible requesters are the write buffers 106-4, the control circuits of the instruction cache 102a, the control circuits of the data cache 102b, and the DMA arbiter unit 106-2.

In computer system 100, to allow for any I/O device whose read operation does not return a datum previously written (i.e. to allow for devices such as the Advanced CRT Controller SCC63484 discussed above), before a data read operation can proceed, the pending write operations in the write buffers must be completed. However, the latency resulting from the CPU core 103 stalling due to an instruction cache miss impacts the performance of the CPU core 103. The extent performance is affected relates to the size of the instruction cache. As the instruction cache size increases, the hit ratio of the cache also increases, resulting in a lesser portion of the total execution time the CPU core 103 executes stall cycles.

However, since it is observed that instructions are not involved in store operations to main memory, an instruction read operation can proceed without waiting for the pending write operations to complete. Hence, performance can be gained by assigning an instruction read operation a priority higher than a pending write operation. Data read operation, however, must remain lower in priority than pending write operation to ensure data coherency.

DMA devices must also be given a high priority. Since a DMA device must request from processor 101 the control of the address/data bus 153a, if priority of a DMA transfer is lower than a CPU transfer (i.e. a read or write operation), it is possible that the time between a DMA request is issued and the time the DMA device is granted access to the address/data bus 153a can be unpredictable. In some devices, where the DMA transfer must be completed within a certain time limit, failure by the processor 101 to grant the address/data bus 153a within such time limit can cause loss of data. Therefore, a DMA transfer should be given higher priority than a CPU transfer.

Finally, to avoid system complexity, it is important that a transaction already begun be allowed to complete without interruption or preemption.

Therefore, in accordance with the present invention, the following hierarchy of priorities (in decreasing priority order) is established:

1. A transaction already begun;
2. A request by a DMA device;
3. An instruction read request by the processor;
4. A write request by the processor or write buffer; and
5. A read request, whether a data reference or a reference to an uncacheable part of memory.

Under this scheme, as implemented by computer system 100, because a transaction on address/data bus 153a cannot be interrupted, arbitration occurs only when the previous transaction has completed. Transaction completion is signalled in processor 101 by the negation of either the $\overline{\text{BusGnt}}$, the $\overline{\text{Rd}}$ or the $\overline{\text{W}}$ signal. In the present embodiment, a write request is initiated by the CPU core 103 asserting the memory write signal ($\overline{\text{MemWr}}$), which is received by the write buffer 106-4. The write buffer 106-4 then negates the write buffer empty ($\overline{\text{WbEmDty}}$) signal, if there is no pending write operation to complete. Otherwise, the $\overline{\text{Empty}}$ signal is held negated until all pending write requests received are completed. A read request is initiated by the CPU core 103 by asserting the memory read signal ($\overline{\text{MemRd}}$) and terminated by the BIU 106-1 asserting the read busy signal ($\overline{\text{RdBusy}}$). The CPU core 103 also provides two signals AccTyp(2) and AccTyp(0), which are both asserted when a miss occurs at instruction cache 102a. A DMA request is pending when the signal on the pin $\overline{\text{BusReq}}$ of processor 101 is asserted.

Figure 2:
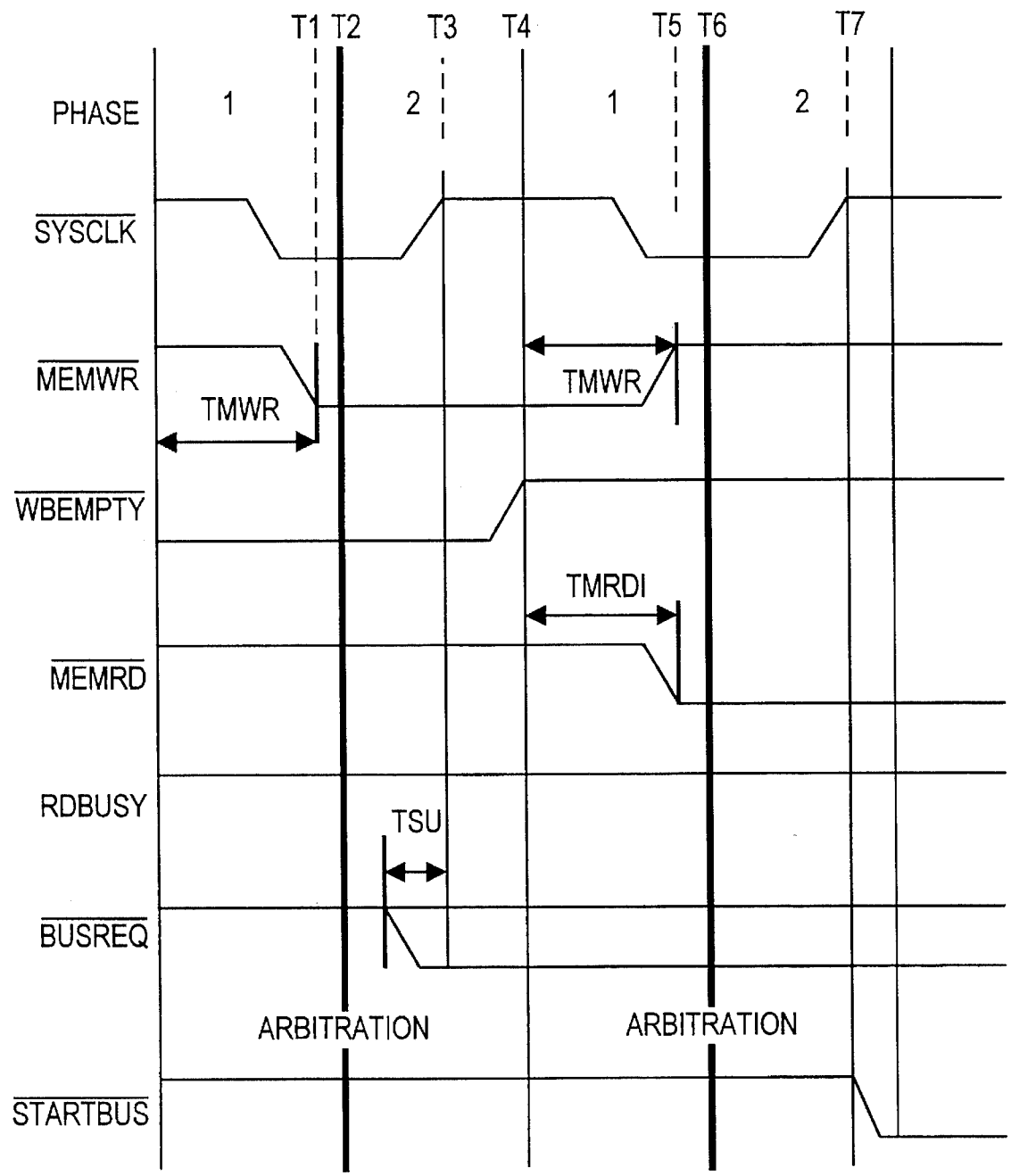
FIG. 2 is a timing diagram illustrating arbitration on the address/data bus 153a of the computer system shown in FIG. 1, in accordance with the present invention.

FIG. 2 is a timing diagram of an arbitration in accordance with the present invention. In FIG. 1, the processor clock signal is provided at the top as the phases of the signal PhiClk. In phase 1, a data cache address is presented to data cache 102b, and a previous instruction cache (102a) read is completed. In phase 2, the returned data is read into CPU core 103 from data cache 102a, and the address of the next instruction is presented at instruction cache 102a. The transitions of the clock signal $\overline{\text{SysClk}}$ are also shown in FIG. 2. As shown in FIG. 2, at time t1, a memory write request is initiated by CPU core 103 asserting the signal $\overline{\text{MemWr}}$. As discussed above, this signal is not directly provided to the arbiter circuit of the bus interface unit 106-1, but received at write buffer 106-3, which respond by negating the $\overline{\text{WbEmpty}}$ signal at time t4. Arbitration in processor 101 occurs between phase 1 and phase 2 every clock period, e.g. time t2, when the address/data bus 153a is idle. FIG. 2 does not show a pending bus request at time t2. However, a DMA request is received by processor 101 at time t3 and a memory read request (i.e. both $\overline{\text{MemRd}}$ and RdBusy asserted) is initiated by CPU core 103 at time t5. Therefore, at the arbitration of time t6, the arbiter circuit in BIU control unit 106-1 granted address/data bus 153a to a DMA device, as shown in FIG. 2 by the assertion of the bus granted signal $\overline{\text{StartGnt}}$ at time t7. Although all three types of memory access, i.e. read, write and DMA, are shown within one $\overline{\text{SysClk}}$ period in FIG. 2, this is a relatively rare occurrence. However, any two memory access types requesting the use of address/data bus 153a in the same $\overline{\text{SysClk}}$ cycle can be expected to occur frequently.

Figure 3:
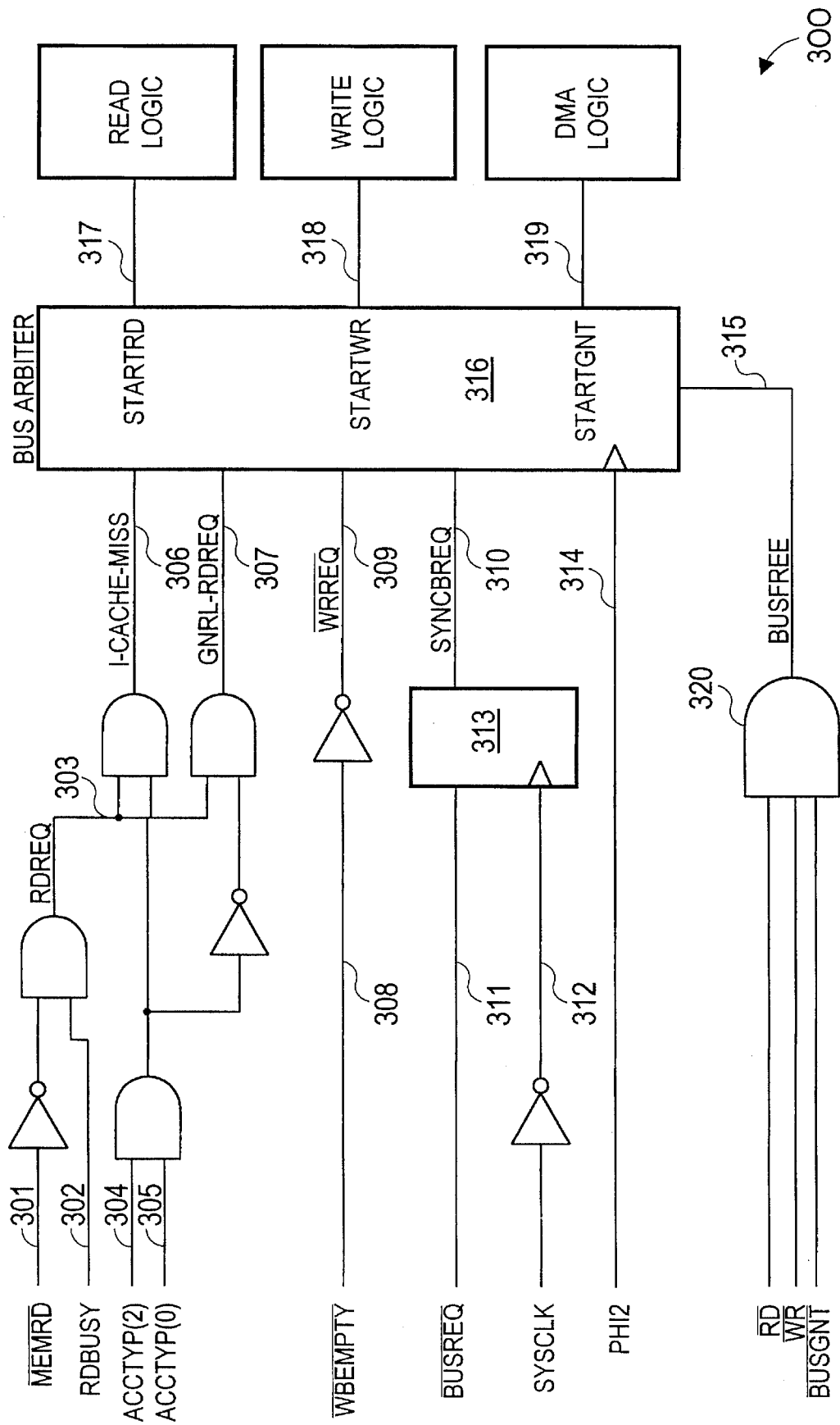
FIG. 3 is a block diagram of a circuit 300 suitable for use in processor 101 for arbitration of the address/data bus 153a, in accordance with the present invention.

The priority scheme of the present invention can be implemented in processor 101 by circuit 300 shown in block diagram form in FIG. 3. As shown in FIG. 3, a arbiter circuit 316 is clocked by the clock signal Phi2, which runs at the same frequency as the processor clock, since arbitration is to occur between the first and second phases of the processor clock. Circuit 316 is enabled by the signal BusFree, which is asserted when the signals $\overline{\text{Wr}}$, $\overline{\text{Rd}}$ and $\overline{\text{BusGnt}}$ are all negated, indicating an idle address/data bus 153a, as explained above. The signals $\overline{\text{MemRd}}$, RdBusy, AccTyp(0) and AccTyp(1) received on terminals 301, 302, 304 and 305 respectively are decoded to determine whether the read request on $\overline{\text{MemRd}}$ (RdBusy asserted) signals results from an instruction cache miss. If the read request results from an instruction cache miss, the instruction cache miss signal (I_cache_miss) on terminal 306 is asserted. Otherwise, the general read request signal (Gnrl_RdReq) is asserted. The negation of the $\overline{\text{WbEmDty}}$ signal provides a write request ($\overline{\text{WrReq}}$) signal on terminal 309 at the arbiter circuit 316. The DMA request signal BusReq is received at the arbiter circuit 316 after synchronization with the bus clock signal SysClk at latch 313. Arbiter circuit 316 indicates grant of the address/data bus 153a by asserting one of the StartRd, StartWr, and the StartGnt signals on terminals 317, 318, and 319 respectively. The StartRd, StartWr, and StartGnt are received by the logic circuits of the read buffer 106-3, the write buffer 106-4 and the DMA control unit 106-2 respectively. Hence, the priority scheme of the present invention can be implemented with minimal complexity on silicon and achieves high performance.

The above detailed description is provided to illustrate the specific embodiments provided above, and not intended to be limiting the present invention. Many modifications and variations within the scope of the present invention are possible. The present invention is defined by the following Claims.

We claim:

1. A structure for granting use of a memory bus in a computer system, comprising:

means for receiving an instruction read request;

means for receiving a data read request;

means for receiving a write request;

means for receiving a clock signal;

means for granting use of said memory bus at a transition of said clock signal accord; to the decreasing priority order; (i) any said instruction read request received; (ii) any said write request received; and (iii) any said data read request received.

2. A structure as in claim 1, further comprising means for receiving a DMA request, and wherein said granting means provides any said DMA request a higher priority over any said instruction read request received.

3. A structure as in claim 1, wherein said computer system comprises a cache memory, and said instruction and data read requests includes reading requests arising from misses in said cache memory.

4. A structure as in claim 1, wherein said computer system comprises a microprocessor with an on-chip cache.

5. A structure as in claim 1, wherein said granting means grants use of said memory bus only when said memory bus is free.

6. A method for granting use of a memory bus in a computer system, comprising the steps of:

providing means for receiving an instruction read request;

providing means for receiving a data read request;

providing means for receiving a write request;

providing means for receiving a clock signal;

granting use of said memory bus at a transition of said clock signal according to the decreasing priority order:
    (i) any said instruction read request received; ii) any said write request received; and (iii) any said data read request received.

7. A method as in claim 6, further comprising the step of providing means for receiving a DMA request, and wherein said granting step comprises the step of according any said DMA request received a higher priority over any said instruction read request received.

8. A method as in claim 6, wherein said computer system comprises a cache memory, and said steps of providing means for receiving instruction and data read requests include respectively the steps of providing means for receiving instruction and data reading requests arising from misses in said cache memory.

9. A method as in claim 6, wherein said computer system comprises a microprocessor with an on-chip cache.

10. A method as in claim 6, wherein said granting step grants use of said memory bus only when said memory bus is free.

* * * * *